US010981842B2

(12) United States Patent
Connell et al.

(10) Patent No.: US 10,981,842 B2
(45) Date of Patent: Apr. 20, 2021

(54) EXPLODED BIOMASS BASED SLOW-RELEASE FERTILIZER

(71) Applicant: SULVARIS INC., Calgary (CA)

(72) Inventors: Angus Connell, Calgary (CA); Eric Pedersen, Calgary (CA); Satish Iyer, Calgary (CA); Richard Knoll, Calgary (CA)

(73) Assignee: Sulvaris Inc., Calgary (CA)

( * ) Notice: Subject to any disclaimer, the term of this patent is extended or adjusted under 35 U.S.C. 154(b) by 0 days.

(21) Appl. No.: 15/311,040

(22) PCT Filed: Jun. 1, 2015

(86) PCT No.: PCT/CA2015/050504
§ 371 (c)(1),
(2) Date: Nov. 14, 2016

(87) PCT Pub. No.: WO2015/179987
PCT Pub. Date: Dec. 3, 2015

(65) Prior Publication Data
US 2017/0081253 A1 Mar. 23, 2017

Related U.S. Application Data

(60) Provisional application No. 62/005,062, filed on May 30, 2014.

(51) Int. Cl.
*C05G 5/40* (2020.01)
*C05B 7/00* (2006.01)
*C05C 3/00* (2006.01)
*C05G 1/00* (2006.01)
*C05D 9/02* (2006.01)
*C05F 11/00* (2006.01)
*C05D 9/00* (2006.01)
*C05G 3/40* (2020.01)

(52) U.S. Cl.
CPC .............. *C05G 5/40* (2020.02); *C05B 7/00* (2013.01); *C05C 3/00* (2013.01); *C05D 9/00* (2013.01); *C05D 9/02* (2013.01); *C05F 11/00* (2013.01); *C05G 1/00* (2013.01); *C05G 3/40* (2020.02)

(58) Field of Classification Search
CPC ...... C05G 3/0047; C05G 3/0094; C05G 1/00; C05F 11/00; C05D 9/00; C05D 9/02; C05C 3/00; C05B 7/00
See application file for complete search history.

(56) References Cited

U.S. PATENT DOCUMENTS

| | | | |
|---|---|---|---|
| 1,105,607 A * | 8/1914 | Benjamin | C05F 11/00 127/36 |
| 2,067,311 A | 1/1937 | Hans | |
| 2,985,643 A | 5/1961 | Boomer et al. | |
| 3,218,149 A | 11/1965 | Sproull et al. | |
| 4,461,648 A | 7/1984 | Foody | |
| 6,306,248 B1 | 10/2001 | Eley | |
| 7,585,652 B2 | 9/2009 | Foody et al. | |
| 8,198,211 B2 | 6/2012 | Johnson et al. | |
| 8,278,080 B2 | 10/2012 | Yoon | |
| 2008/0047313 A1* | 2/2008 | Johnson | B01D 53/58 71/31 |
| 2011/0212487 A1 | 9/2011 | Emme | |
| 2011/0224070 A1 | 9/2011 | Meisner et al. | |
| 2012/0137744 A1* | 6/2012 | Johnson | B01D 53/58 71/31 |
| 2013/0252293 A1 | 9/2013 | Chen | |

FOREIGN PATENT DOCUMENTS

| | | |
|---|---|---|
| CN | 102190293 A | 9/2011 |
| FR | 756614 | 12/1933 |
| FR | 877865 | 1/1943 |
| RU | 2012121877 | 11/2015 |
| WO | 9512560 | 5/1995 |
| WO | 2008022461 | 2/2008 |

OTHER PUBLICATIONS

Briggs, David George. Forest products measurements and conversion factors: With special emphasis on the US Pacific Northwest. Chapter 7 College of Forest Resources, University of Washington, 1994. pp. 83-94.*
Agbor et al, "Biomass Pretreatment: Fundamentals toward Application", Biotech. Advances 29 (2011) 675-685.
Jagtoyen et al., "Activated Carbons from Steam Exploded Wool" Preprints of Papers, American Chemical Society Division of Fuel Chemistry; vol. 40, issue 2; p. 288-293 (Dec. 31, 1995).
Galletti & Antonetti, "Biomass pre-treatment: separation of cellulose, hemicellulose and lignin. Existing technologist and perspective" University of Pisa, Department of Chemistry and Industrial Chemistry (Sep. 19, 2011).
Jens K Laursen et al "WSA-Meeting industry demands" (Sep. 1, 2007).

* cited by examiner

*Primary Examiner* — Jennifer A Smith
(74) *Attorney, Agent, or Firm* — Bennett Jones LLP

(57) ABSTRACT

A fertilizer product comprising an acid-carbonized microporous matrix derived from expanded biomass and a fertilizer reaction product of residual acid from the carbonizing process and at least one added fertilizer precursor. The biomass may include steam exploded wood powder. The expanded biomass may be carbonized with a combination of sulphuric and phosphoric acids, followed by ammoniation to produce ammonium sulphate and mono- or diammonium phosphate. The fertilizer reaction product adsorbs onto the carbon matrix, which results in a slow-release when the material is applied to the soil.

9 Claims, No Drawings

EXPLODED BIOMASS BASED SLOW-RELEASE FERTILIZER

FIELD OF THE INVENTION

The present invention relates to a novel slow-release fertilizer produced from exploded biomass, and methods for producing the same.

BACKGROUND

Many techniques have been developed for delivering nutrients to growing plants and for extending or delaying the release of nutrients from a fertilizer. Fertilizer is often applied to the ground as a formulated solid granule or powder, or as a liquid.

There are basically two types of fertilizers, water-soluble fertilizers and "slow-release" fertilizers. While water-soluble fertilizers are generally less expensive than slow-release fertilizers, they have the disadvantage of leaching nutrients very quickly into and through the soil. Slow-release fertilizers are designed to release nutrients to plants or soil over an extended period of time, which is more efficient than multiple applications of water-soluble fertilizers. Therefore, slow-release (also referred to as controlled release or extended release) fertilizers minimize the frequency with which plants must be fertilized, as well as reduce or minimize leaching. The major advantage of slow release fertilizers is the optimal release and absorption of the crop input nutrient by the roots along the period of growth, thus minimizing wastage of the nutrient and delivering better economic value.

Some solid, water-soluble fertilizers can be converted into slow-release fertilizers by employing various coatings. Also, some polymers may bind primary nutrients such as nitrogen in an insoluble form. Polymer coatings such as urea-formaldehyde (UF) condensation products such as polyurethane are widely used as slow-release nitrogen fertilizers for crops, ornamental plants and grasses. Urea-formaldehyde fertilizer materials also can be supplied either as liquids or as solids. Such materials generally contain at least 28% nitrogen, largely in a water-insoluble, slowly available form.

Extended release UF fertilizers may be prepared by reacting urea and formaldehyde at an elevated temperature in an alkaline solution to produce methylol ureas. The methylol ureas then are acidified to polymerize the methylol ureas to methylene ureas, which increase in chain length as the reaction is allowed to continue. These methylene urea polymers normally have limited water solubility, and, thus, release nitrogen throughout an extended period. Such UF fertilizers usually include a mixture of methylene urea polymers generally have a range of molecular weights and are understood to be degraded slowly by microbial action into water-soluble nitrogen. UF fertilizers are usually categorized by the amount and the release characteristics of their water insoluble nitrogen.

Polymer coated slow-release fertilizers suffer from certain disadvantages. The polymer shell may crack or be damaged during transportation and handling, resulting in unrestricted moisture ingress and loss of slow-release ability. The polymer shells are often poorly biodegradable, and build up in the soil after repeated use.

Granular nitrogen-containing fertilizers have been produced commercially by a variety of techniques using water-soluble nitrogen products, such as urea, potassium nitrate, and ammonium phosphate. The practical advantages of handling, blending, and storing such fertilizer granules are known and well documented. The preparation of granular fertilizers using slow-release UF fertilizers also has been described in the prior art.

Nitrogen fertilizer comprising ammonium salts may be produced by absorbing ammonia with an acid. However, uncoated slow-release formulations of such soluble nitrogen fertilizers are not known.

SUMMARY OF THE INVENTION

In general terms, the invention comprises a slow-release fertilizer product comprising an acid-carbonized microporous matrix formed from an expanded biomass, and a fertilizer reaction-product of residual acid from the carbonizing process and at least one added fertilizer precursor. The biomass may comprise fibrous lignocellulosic biomass, which is expanded or defribrillated to create a structure which becomes microporous upon carbonization, and which comprises exposed lignin. In one embodiment, the biomass is defibrillated by gas-expansion, thermal, mechanical or chemical means. In one embodiment, the biomass is expanded using steam explosion, supercritical gas expansion, or thermomechanical methods.

In one embodiment, the expanded biomass is carbonized with sulphuric acid, or phosphoric acid, or a combination of sulphuric and phosphoric acids. The carbonization process results in some residual acid embedded in the pore volume of the microporous structure, however, in one embodiment, the amount of acid used is controlled so as to avoid saturating the pore volume. A liquid fertilizer precursor may then be added to the pore volume, resulting in reactions with the residual acid and the creation of fertilizer products within the pore volume.

If the expanded biomass is carbonized with sulphuric acid, phosphoric acid may be added as a fertilizer precursor, followed by exposure to ammonia, in either gas or liquid form. The resulting fertilizer products comprise ammonium sulphate from the reaction between ammonia and residual sulphuric acid, and mono or diammonium phosphate from the reaction between ammonia and the phosphoric acid.

In another embodiment, the added fertilizer precursor comprises potassium hydroxide, which will react with residual sulphuric acid to form potassium sulphate. Additional sulphuric acid may be added to react with any excess potassium hydroxide to form additional potassium sulphate.

If the expanded biomass is carbonized with sulphuric acid, a portion of the sulphuric acid may react with the lignin exposed during the biomass expansion process, to form lignosulphonates. The amount of sulphuric acid may be controlled to substantially carbonize the expanded biomass, react with lignin to form lignosulphonates, and leave some residual sulphuric acid in the pore volume of the carbonized microporous matrix for subsequent fertilizer forming reactions.

Therefore, in one aspect, the invention comprises a slow-release fertilizer product comprising an acid-carbonized microporous matrix derived from expanded biomass and a fertilizer reaction-product of residual acid from the carbonizing process and at least one added fertilizer precursor.

In one embodiment, the fertilizer precursor comprises one or more of additional sulphuric acid, phosphoric acid, nitric acid, potassium hydroxide, ammonia, sulphur dioxide, or hydrogen sulphide. The product may further comprise a micronutrient, which may comprise Mg, Cu, Zn, Fe, B, Mn, or Mo.

In another aspect, the invention may comprise a method of forming a slow-release fertilizer product, comprising the steps of:
(a) carbonizing an expanded biomass material with either or both sulphuric acid and phosphoric acid to form a microporous carbon matrix, leaving residual acid in the pore volume; and
(b) adding a fertilizer precursor to react with the residual acid to form a fertilizer.

In one embodiment, the amount of acid is selected so as to leave open pore volume after carbonization. The fertilizer precursor may be a gas or liquid and added to the open pore volume. In one embodiment, the biomass is expanded prior to carbonization by steam explosion.

In another aspect, the invention may comprise an intermediate product for producing a fertilizer product, comprising:
(a) an acid-carbonized microporous matrix derived from expanded biomass, having an available pore volume; and
(b) a residual acid from the carbonizing process impregnated in the pore volume, in an amount less than 71% by weight of the intermediate product, and/or less than about 80% of the available pore volume.

DETAILED DESCRIPTION OF PREFERRED EMBODIMENTS

The present invention relates to a novel slow-release fertilizer produced from expanded fibrous lignocellulosic biomass materials. The biomass is expanded by means of using expansion techniques such as steam explosion or mechanical defibrillation. As used herein, "expanded fibrous lignocellulosic biomass" means fibrous lignocellulosic biomass which has been expanded so as to disrupt the fibrous structure, and disrupt or destroy cell wall structures, thereby creating a microporous matrix and increasing the available surface area for reaction. As used herein, a slow- or controlled-release fertilizer is a fertilizer containing a plant nutrient in a form which delays its availability for plant uptake and use after application, or which extends its availability to the plant significantly longer than a reference 'rapidly available nutrient fertilizer' such as ammonium nitrate or urea, ammonium phosphate or potassium chloride. Such delay of initial availability or extended time of continued availability may occur by a variety of mechanisms. These include controlled water solubility of the material by semi-permeable coatings, occlusion, protein materials, or other chemical forms, by slow hydrolysis of water-soluble low molecular weight compounds, or by other unknown means. Without restriction to a theory, the slow-release fertilizers of the present invention rely on the adsorption of fertilizer onto a microporous carbon matrix.

The process of expansion of the biomass may result in increased pore volume and/or surface area. As used herein, pore volume means a measure of the void (i.e., "empty") spaces in a material, and is conventionally expressed as a fraction of the volume of voids over the total volume, between 0 and 1, or as a percentage between 0 and 100%.

In one embodiment, the fibrous lignocellulosic biomass comprises material such as wood chips or wood particles, sugarcane bagasse, cereal straw, corn stover, and other similar material. In one preferred embodiment, the biomass may comprise a wood powder, such as a softwood such as pine, formed by grinding or pulverizing wood chips to particle sizes in the range of about 100 microns to about 500 microns.

Lignocellulosic fibers are a cellular composite material comprising lignin, cellulose and hemicelluloses. The cell walls are formed from cellulose microfibrils embedded in a matrix of hemiceullulose and lignin. Cellulose microfibrils are composed of cellulose assembled into long overlapping parallel arrays a few nanometers in diameter. The rigidity and orientation of these microfibrils control cell expansion. Hemicellulose is a branched heteropolymer polysaccharide with a random, amorphous structure with little strength. Lignin is a complex network of phenolic compounds found in secondary cell walls of woody tissues, and occupies the interstices between other cell wall components making the walls rigid and permanent Expansion of the fibers, such as by steam explosion, results in the opening up of the fiber and complete or partial destruction of the cell walls. Both steam and acetic acid, which is released from the biomass during steam explosion, trigger the hydrolysis of hemicelluloses. The lignin becomes exposed on the surface of the cellulose microfibrils, and as a result, the exposed lignin is more readily available for in-situ reactions. There is a significant increase in porosity and surface area of the expanded biomass. The bulk density of the biomass may decrease by greater than about 30%, 50%, 100%, 200%, or 300%.

Expansion of the biomass in this context is largely similar to pretreatment of biomass in the field of biofuel production. The goal is to greatly increase the surface area of the biomass, thereby increasing the susceptibility of the biomass to chemical modification, for subsequent processing steps. Various pre-treatments are surveyed in Agbor et al, "Biomass Pretreatment: Fundamentals toward Application", Biotech. Advances 29 (2011) 675-685, the entire contents of which are incorporated herein by reference, where permitted.

Expansion may be accomplished by a hydrothermal process such as steam explosion, which is a known process to those skilled in the art. Steam explosion is a process in which biomass is treated with hot steam (180° to 240° C.) under pressure (1 to 8 MPa) followed by an explosive decompression of the biomass that results in a rupture of the biomass fibres rigid structure. The sudden pressure release defibrillates the cellulose bundles resulting in exposure of ruptured cells pore volume.

Generally there are several, commercially-available steam explosion processes. In one example, a two-step process is generally used where the material is first heated with lower pressure steam to preheat the biomass, vaporize any residual water and open the pore structure. This preheated material is then pressurized with high pressure steam and soaked for a prescribed period of time and then rapidly depressurized to explosively release the steam from the pores of the biomass. The fibers of the biomass substantially disassociate, resulting in an expanded microporous material. In alternative process, the biomass may be transported with an auger rotating within a sealed cylinder, and pressurized with steam at various points along the auger. In some of these apparatuses, the seal for the steam pressure is provided by a biomass plug and in others by periodic lock-hoppers. Conventional steam explosion is accomplished with steam pressure of from about 200 to about 1000 psig (1.4 MPa to 6.9 MPa) and soak times from about 2 seconds to several minutes. The higher the temperature and pressure, and the longer the soak time, the more complete the fragmentation of the biomass is.

The severity index of a steam explosion treatment ($R_o$) is a function of reaction time (t) and temperature (T) according to the following equation (Overend and Chornet, 1987)

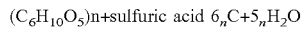

Biomass destruction begins at about 2.0 on this index. With high severity treatments ($R_o > 4$), dehydration and condensation reactions may occur, and sugars may be degraded. In one embodiment, the expanded biomass is created by a treatment with a severity index greater than about 2.0, preferably greater than about 3.0, and more preferably greater than about 4.0.

Mechanical, thermal and/or chemical defibrillation techniques are known and may also be used to produce the expanded biomass. For example, wood may be subjected to grinding and refining steps, similar to those used to produce mechanical pulp. Mechanical defibrillation may be also be used as a pre-treatment step for steam explosion.

In a preferred embodiment, the biomass is expanded by steam explosion. Without restriction to a theory, the use of steam explosion may leave the expanded biomass saturated with steam that will condense if the biomass is immediately quenched with acid at a lower temperature. The expanded biomass saturated with steam will generally come out of the steam explosion process at about 120° C.-200° C. As the condensation of steam will create a vacuum, the acid may be quickly drawn into the pores while it is still concentrated, prior to becoming diluted by dehydration reactions at the surface of the biomass particle. Because of this induction of the acid into the microporous structure of the exploded biomass, less acid may be necessary to complete the carbonization. This same effect can be realized by high-pressure steaming of the biomass even after it has been mechanically expanded, so the mechanism can be used on any type of exploded or ground biomass. Alternatively, the steam exploded biomass may be allowed to cool and/or dry before acid carbonization.

The acid-carbonized microporous matrix is created when expanded biomass source is dehydrated by treatment with a mineral acid or blend of mineral acids. For example, cellulose decomposes to carbon and water:

$$(C_6H_{10}O_5)n + \text{sulfuric acid } 6_nC + 5_nH_2O$$

Hemicellulose is also dehydrated to a carbon. Without restriction to a theory, the reduction in hemicellulose caused by a steam explosion treatment means that less acid is consumed by dehydrating hemicelluloses, as compared with non-expanded biomass.

The reaction of the exploded biomass with acid can include the introduction of sulphuric acid to carbonize the expanded biomass in order to create a microporous carbon matrix which will serve as the slow release carrier for the end fertilizer product. The quantity of sulphuric acid will be chosen to substantially carbonize the expanded biomass, preferably without saturating the pore volume. The goal is to leave sufficient pore space to add at least one additional fertilizer precursor to the pore structure, which may be subsequently converted to a fertilizer product. In one embodiment, the amount of acid to carbonize the biomass may be determined which will leave approximately half the pore volume filled with residual acid. A volume of liquid fertilizer precursor may then be chosen to completely react with the acid and form the desired fertilizer reaction product.

The carbonization of biomass with sulphuric acid conventionally requires an excess of sulphuric acid. For example, in Applicant's co-owned U.S. Pat. No. 8,198,211, weight ratios of greater than 1:1, in the range of 2.5:1 (250%) to 4.5:1 (450%) of acid to biomass were used, which resulted in complete carbonization, and retention and impregnation of residual excess acid. In embodiments of the present invention, significantly less sulphuric acid may still result in substantial or complete carbonization of the expanded biomass, with an amount of residual acid in the pore volume still present and available for conversion to a fertilizer.

In one embodiment, the exploded biomass may be carbonized with sulphuric acid, which may be 40% to 100% concentrated sulphuric acid (by mass fraction), preferably 50% to 100%, and more preferably 75 to 100%. In one embodiment, the biomass material is carbonized with a quantity of sulphuric acid in the range of about 0.25% to about 200% by weight. In one embodiment, the ratio of sulphuric acid is less than 100% of the expanded biomass by weight, preferably in the range of about 25% to about 99%, depending on the characteristics of the biomass, the severity of the biomass expansion treatment, the concentration of sulphuric acid used, and the amount of residual sulphuric acid desired.

In another embodiment, the expanded biomass may be carbonized with a combination of sulphuric acid and phosphoric acid. As the two acids do not react with each other, each will participate in the carbonization of the expanded biomass and remain in residual quantities in the pore volume of the carbonized expanded biomass. As sulphuric acid is more reactive than phosphoric acid, it is likely that more sulphuric acid than phosphoric acid will be consumed in the dehydration reactions during carbonization. However, both acids will be drawn into the pore volume of the expanded biomass, as discussed above.

In another embodiment, the expanded biomass may be carbonized with liquid phosphoric acid. Phosphoric acid melts at about 42° C., and has a density of about 1.89 g/ml as a liquid. To accelerate the carbonization process, it is preferred to preheat the phosphoric acid before addition to the expanded biomass. In one embodiment, the phosphoric acid is preheated to about 100° C. to about 180° C. As such, the phosphoric acid is less dense and viscous, which may allow better penetration of the pore volume.

Phosphoric acid may be used as concentrated acid, or as a solution of at least 50% acid (by mass fraction), and more preferably at least 75%. In one embodiment, the biomass material is carbonized with a quantity of phosphoric acid in the range of about 100% to about 300% by weight of the biomass. In one embodiment, the ratio of phosphoric acid is less than 300% of the expanded biomass by weight, preferably in the range of about 200% to about 250%, depending on the characteristics of the biomass, the severity of the biomass expansion treatment, the moisture content of the biomass, the concentration of phosphoric acid used, and the amount of residual acid desired.

In the carbonization step, substantially complete carbonization of the expanded biomass is achieved in a reasonable time period, resulting in a microporous carbonized matrix, with acid embedded in the available pore volume. This intermediate product is converted to a fertilizer product in a subsequent step. The rate of carbonization is aided by the increased surface area of the expanded biomass. Therefore, the amount of acid required may depend on the severity of the biomass expansion method used and/or the size of the expanded biomass particles. For example, if wood particles after steam explosion have a particle size less than 16 mesh (<1.19 mm), an acid:wood weight ratio of about 1:1 or less (using concentrated sulphuric acid) may be sufficient to completely carbonize the expanded wood particle. An amount of residual sulphuric acid may be present, but saturation of the pore volume of the carbonized expanded biomass matrix is avoided.

The intermediate product for producing a fertilizer product may therefore comprise:
(a) an acid-carbonized microporous matrix derived from expanded biomass, having an available pore volume; and
(b) a residual acid from the carbonizing process impregnated in the pore volume, in an amount less than 71% by weight of the intermediate product, or less than 80% of the available pore volume.

In one embodiment, the residual acid comprises less than about 60%, preferably less than about 50%, and more preferably less than about 40% by weight. By another measure, the residual acid occupies less than about 80%, preferably less than about 70%, more preferably less than about 60% of the available pore volume.

The process of biomass expansion exposes lignin. Without restriction to a theory, a portion of the added sulphuric acid during carbonization reacts with the exposed lignin to form lignosulphonates, which are sulphonated lignin polymers. The resulting lignosulphonates may have very broad distribution of molecular weights, which may depend on the severity of the biomass expansion methods used. The conversion of lignin to lignosulphonate can be controlled by varying the quantity of acid and the process conditions, i.e. the bed temperature. A slight excess of acid may promote the formation of lignosulphonates. Lignosulphonates are known binders used in the formation of fertilizer pellets. As a result, the resulting particles may be formed into pellets without added binders, or with reduced binder requirements.

The sulphuric acid and/or phosphoric acid laden carbonized matrix may then be reacted with other chemicals, such as ammonia. The open pore space in the microporous carbon matrix allows the addition of a liquid fertilizer precursor to form fertilizer products. In one embodiment, if sulphuric acid alone was used for carbonization, an amount of phosphoric acid may be added, The residual sulphuric acid and the added phosphoric acid do not react with each other and hence they remain as such. This intermediate product may then be reacted with ammonia, in either liquid or gas form.

The introduced ammonia will react with the different acid components to form different compounds. For example, in the case of a carbon matrix that contains a mixture of sulphuric acid and phosphoric acid, the sulphuric acid will react with the ammonia to form ammonium sulphate and the phosphoric acid will react with the ammonia to form mono or diammonium phosphate. Both reactions are spontaneous and the resulting product will contain varying amounts of each compound depending on the ratios of acid present in the biomass micro-pores. The formation of mono or diammonium phosphate can be controlled by varying the quantity of ammonia injected into the reaction bed and different compounds can be produced by the use of different acids.

The resulting ammonium sulphate will be acidic of its own accord (salt of a strong acid and weak base). Advantageously, in the presence of an acidic fertilizer compound, the phosphate may be more available for plant nutrition by making it less susceptible to precipitation to calcium or iron phosphates in the soil. Calcium present in the soil will diffuse into the carbon pores at only a very slow rate, preserving the phosphates and sulphates contained there for plant nutrition.

In another embodiment, other basic compounds may be added to react with the residual acid, to create fertilizer products. For example, an aqueous solution of potassium hydroxide may be added as a fertilizer precursor, which will react with residual sulphuric acid in the microporous matrix, to form potassium sulphate and water. These and other examples of added fertilizer precursors, and resulting fertilizer products may be seen in the following table:

| Chemical | Compound Formed |
| --- | --- |
| Sulphuric Acid | Ammonium Sulphate with Ammonia |
| Phosphoric Acid | Ammonium Phosphate with Ammonia |
| Nitric Acid | Ammonium Nitrate with Ammonia |
| Potassium Hydroxide | Potassium Sulphate with Sulphuric Acid |
| Potassium Hydroxide | Potassium Nitrate with Nitric Acid |
| Potassium Hydroxide | Potassium Phosphate with Phosphoric Acid |
| Ammonia | Ammonium phosophate, Ammonium sulphate, ammonium nitrate |
| Sulphur Dioxide | Potassium Sulphite with Potassium Hydroxide |
| Hydrogen Sulphide | Potassium Sulphide with Potassium Hydroxide |

In addition, if desired, micronutrients may be added, in the form of their available salts, such as one or more of Mg, Cu, Zn, Fe, B, Mn, and Mo.

The resulting particles then comprise the microporous carbon matrix, loaded with the fertilizer reaction products in the pore volume, and optional micronutrients, and may include exposed lignosulphonates. The particles may then be blended with additional binders and water if necessary, and either granulated using traditional granulation techniques or pelletized using any commonly available pellet mills. Any other beneficial salt or mineral could be added to improve the nutritive value of the fertilizer product. The granulated or pelletized product is then dried using commonly known methods following which it is cooled and, optionally, a coating may be applied to prevent dusting and improve storage properties. The resulting products can be used as fertilizers for enhancing the growth of plants. The carbon in the carbonized microporous matrix may act as an exchange substrate so that when water is introduced and the salt compounds dissociate, the carbon binds to the resulting anions and cations, resulting in a slow release over an extended period of time. Therefore, the products may have utility as slow-release product of water soluble fertilizer compounds.

Excess acid and fertilizer precursors may be used to form fertilizer which will be associated with the microporous carbon matrix, but not adsorbed on the carbon matrix. Thus, a proportion of the fertilizer products may be immediately available from the pore volume, while another portion will be bound and be slowly released. The proportion between immediately available and slowly released fertilizer may be controlled by varying the excess amount of acid and fertilizer precursor material.

EXAMPLES

Example 1

As a first step, biomass in the form of pine wood powder (size range approximately 100-500 microns with a moisture content of about 6% by weight) is steam exploded by soaking in steam at 220° C. at 3 MPa, followed by explosive decompression. The material is observed to expand in volume by about 30%. 1 kg of expanded biomass is treated with 2.86 kg of concentrated sulphuric acid (93% by mass fraction) to produce microporous carbon matrix. No heating is required, as this reaction is exothermic and hence it proceeds with liberation of heat which will raise the biomass temperature to 100-180° deg. C. 2.86 kg of concentrated phosphoric acid (93% by mass fraction) is then added to further fully impregnate the carbon alongside sulphuric acid which is already partially present in the pores from the first step. The phosphoric acid may be preheated to about 150° C. The higher bed temperature helps reduce the density and viscosity of the phosphoric acid which allows it to diffuse and penetrate deep into the pores of the carbon matrix to yield an intermediate product. The resulting intermediate product is ammoniated using 1.82 kg of gaseous anhydrous ammonia to yield 7.71 kg of ammonium sulphate and diammonium phosphate product adsorbed in the carbon matrix. The ratio of ammonium sulphate and ammonium phosphate can be varied by controlling the quantity of sulphuric acid added in the first step and the quantity of phosphoric acid added in the second step.

In another example, 1 kg of expanded biomass on a dry weight basis is treated in one single step with 5.72 kg of a blend of equal amounts of sulphuric acid and phosphoric acid (each 93%). Sulphuric acid and phosphoric acid do not react with each other and on such treatment the sulphuric acid being the stronger hygroscopic acid, will react first with the biomass converting it to microporous carbon matrix which will then allow the phosphoric acid as well to diffuse into the pore structure of the carbon matrix along with sulphuric acid. Thus, an intermediate product is formed with a carbon matrix impregnated with a combination of sulphuric acid and phosphoric acid. The intermediate product is then ammoniated to obtain a slow release fertilizer consisting of ammonium sulphate and ammonium phosphate in a carbon matrix.

Example 2

1 kg of expanded biomass as in Example 1 is reacted with 5.72 kg of concentrated phosphoric acid (93%) to convert the biomass to carbon. The phosphoric acid is preheated to 150° C. The heat also helps in reducing the density and viscosity of phosphoric acid aiding in better diffusion into the micro pores of the carbon matrix. This intermediate product (phosphoric acid impregnated carbon matrix) is ammoniated with 1.82 kg of anhydrous ammonia to yield 7.71 Kg of diammonium phosphate product.

1 kg of intermediate product formed in Example 2 above is reacted with 9.75 kg potassium hydroxide (in aqueous solution) to yield 14.95 kg of tripotassium phosphate.

INTERPRETATION AND DEFINITION

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

What is claimed is:

1. A method of forming a fertilizer product, comprising the steps of:
   (a) carbonizing an expanded biomass material with an acid to form a microporous carbon matrix, leaving residual acid in the pore volume of the microporous carbon matrix, wherein the biomass is expanded by steam explosion, prior to carbonization to have an exposed ruptured cell pore volume, wherein the expanded biomass material saturated with steam at about 120° C. to 200° C., as produced by the steam explosion, is quenched with the acid at a lower temperature than the temperature of the expanded biomass material; and
   (b) adding a fertilizer precursor to react with the residual acid to form a fertilizer in the pore volume of the microporous carbon matrix.

2. The method of claim 1 wherein a mechanical defibrillation method is used as a pre-treatment step for steam explosion.

3. The method of claim 1 wherein the biomass is expanded by steam explosion having a severity index of greater than about 2.0.

4. The method of claim 1 wherein the expanded biomass material is carbonized with a quantity of acid less than or equal to 93% ratio of acid to biomass by weight.

5. The method of claim 4 wherein the expanded biomass material is carbonized with a quantity of acid greater than about 25% and less than or equal to 93% ratio of acid to biomass by weight.

6. The method of claim 4 wherein the acid comprises sulphuric acid.

7. The method of claim 1, wherein the amount of acid used leaves open pore volume and the fertilizer precursor is added to the open pore volume.

8. The method of claim 1 wherein the acid comprises one or a combination of sulphuric acid, phosphoric acid or nitric acid.

9. The method of claim 1 wherein lignin of the biomass is exposed by the steam explosion, and the acid comprising sulphuric acid reacts with the exposed lignin to form a lignosulphonate reaction product.

* * * * *